US011780561B2

(12) United States Patent
Marone et al.

(10) Patent No.: US 11,780,561 B2
(45) Date of Patent: *Oct. 10, 2023

(54) PROPELLER BLADE ANGLE FEEDBACK ARRANGEMENT AND METHOD

(71) Applicant: PRATT & WHITNEY CANADA CORP., Longueuil (CA)

(72) Inventors: Joseph Ernesto Marone, Montreal (CA); Ella Yakobov, Montreal (CA); Ian Farrell, Greenfield Park (CA); Olivier Basse, Saint-Bruno (CA); Martin Dobson, Brossard (CA); Martin Clermont, Montreal (CA); Marc Lavoie, Otterburn Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 111 days.

This patent is subject to a terminal disclaimer.

(21) Appl. No.: 17/326,993

(22) Filed: May 21, 2021

(65) Prior Publication Data

US 2021/0284322 A1 Sep. 16, 2021

Related U.S. Application Data

(63) Continuation of application No. 16/036,930, filed on Jul. 16, 2018, now Pat. No. 11,046,422.

(51) Int. Cl.
*B64C 11/06* (2006.01)
*B64C 11/30* (2006.01)
(Continued)

(52) U.S. Cl.
CPC ............ *B64C 11/06* (2013.01); *B64C 11/301* (2013.01); *B64C 11/34* (2013.01); *B64D 45/02* (2013.01)

(58) Field of Classification Search
CPC ........ B64C 11/02; B64C 11/06; B64C 11/16; B64C 1/20; B64C 11/30; B64C 11/301;
(Continued)

(56) References Cited

U.S. PATENT DOCUMENTS 4,934,901 A 6/1990 Duchesneau
5,897,293 A 4/1999 Arel et al.
(Continued)

FOREIGN PATENT DOCUMENTS

EP 0353076 1/1990

*Primary Examiner* — Courtney D Heinle
*Assistant Examiner* — Sang K Kim
(74) *Attorney, Agent, or Firm* — NORTON ROSE FULBRIGHT CANADA LLP (57) ABSTRACT

There is provided a blade angle feedback assembly for a propeller of an aircraft engine. The propeller is rotatable about an axis and has propeller blades rotatable about respective spanwise axes to adjust a blade angle thereof. The blade angle feedback assembly comprises a feedback ring having a plurality of position markers disposed thereon, at least one sensor configured to provide feedback on the blade angle of the propeller blades by detecting a relative movement between the feedback ring and the at least one sensor, and at least one shielding element provided between the feedback ring and the propeller, the at least one shielding element configured to shield the feedback ring from electromagnetism.

20 Claims, 9 Drawing Sheets

(51) Int. Cl.
*B64C 11/34* (2006.01)
*B64D 45/02* (2006.01)

(58) Field of Classification Search
CPC ....... B64C 11/34; B64C 11/44; B64C 27/006;
B64C 27/32; B64D 45/02; F03D 80/30;
F05D 2270/80
See application file for complete search history.

(56) References Cited

U.S. PATENT DOCUMENTS

| | | | |
|---|---|---|---|
| 5,913,659 A | 6/1999 | Doolin et al. | |
| 6,077,040 A | 6/2000 | Pruden et al. | |
| 6,672,835 B1* | 1/2004 | Hughes | B64C 11/301 |
| | | | 416/155 |
| 8,222,762 B2 | 7/2012 | Borgen | |
| 8,687,206 B2 | 4/2014 | Hockaday | |
| 8,985,953 B2 | 3/2015 | Chuc et al. | |
| 9,821,901 B2 | 11/2017 | Duke et al. | |
| 2011/0284688 A1* | 11/2011 | Chuc | B64D 45/02 |
| | | | 416/147 |
| 2014/0007591 A1 | 1/2014 | Khibnik et al. | |
| 2015/0139798 A1* | 5/2015 | Duke | G01P 3/488 |
| | | | 416/61 |
| 2015/0252690 A1* | 9/2015 | Curlier | F16N 21/00 |
| | | | 60/39.08 |
| 2017/0350253 A1 | 12/2017 | Jacobs | |
| 2018/0050789 A1 | 2/2018 | Marone | |
| 2018/0304991 A1* | 10/2018 | Kudrna | B64C 11/301 |
| 2019/0055005 A1* | 2/2019 | Young | B64C 13/30 |
| 2019/0263514 A1* | 8/2019 | Schmiedel | B64C 27/51 |

\* cited by examiner

PROPELLER BLADE ANGLE FEEDBACK ARRANGEMENT AND METHOD

CROSS-REFERENCE TO RELATED APPLICATION

This application is a continuation of U.S. application Ser. No. 16/036,930 filed Jul. 16, 2018, the entire contents of both of which are incorporated by reference herein.

TECHNICAL FIELD

The present disclosure relates generally to engines, and more specifically to propeller blade angle position feedback systems.

BACKGROUND OF THE ART

On featherable propeller systems, it is desirable to accurately measure the propeller blade (or beta) angle to ensure that the blade angle is controlled according to the engine power set-point requested, such as in reverse and low pitch situations, also known as the beta operating region.

Some propeller feedback systems use a phonic wheel, sometimes referred to as a beta or feedback ring, which can be vulnerable to magnetism and arc, e.g. upon a lightning strike to the propeller. Errant magnetic fields on the feedback ring may also cause false triggering of the sensor, leading to inaccurate measurements.

Therefore, improvements are needed.

SUMMARY

In accordance with a first broad aspect, there is provided a blade angle feedback assembly for a propeller of an aircraft engine. The propeller is rotatable about an axis and has propeller blades rotatable about respective spanwise axes to adjust a blade angle thereof. The blade angle feedback assembly comprises a feedback ring having a plurality of position markers disposed thereon, at least one sensor configured to provide feedback on the blade angle of the propeller blades by detecting a relative movement between the feedback ring and the at least one sensor, and at least one shielding element provided between the feedback ring and the propeller, the at least one shielding element configured to shield the feedback ring from electromagnetism.

In accordance with a second broad aspect, there is provided an aircraft propeller system comprising a propeller rotatable about an axis and having propeller blades rotatable about respective spanwise axes to adjust a blade angle thereof, a feedback ring having a plurality of position markers disposed thereon, and at least one shielding element provided between the feedback ring and the propeller, the at least one shielding element configured to shield the feedback ring from electromagnetism.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
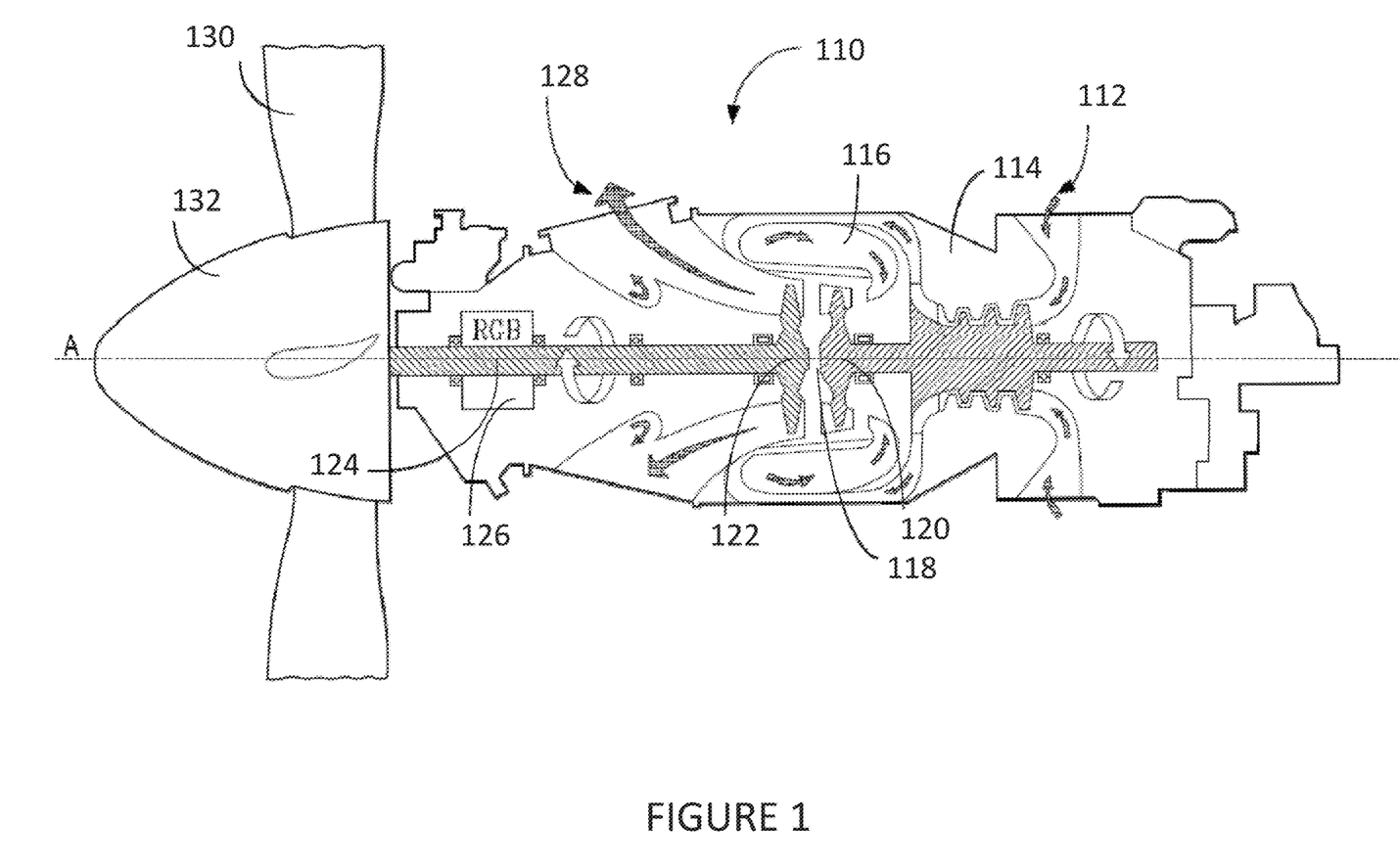
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft 124 about a propeller shaft axis 'A' through a reduction gearbox 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
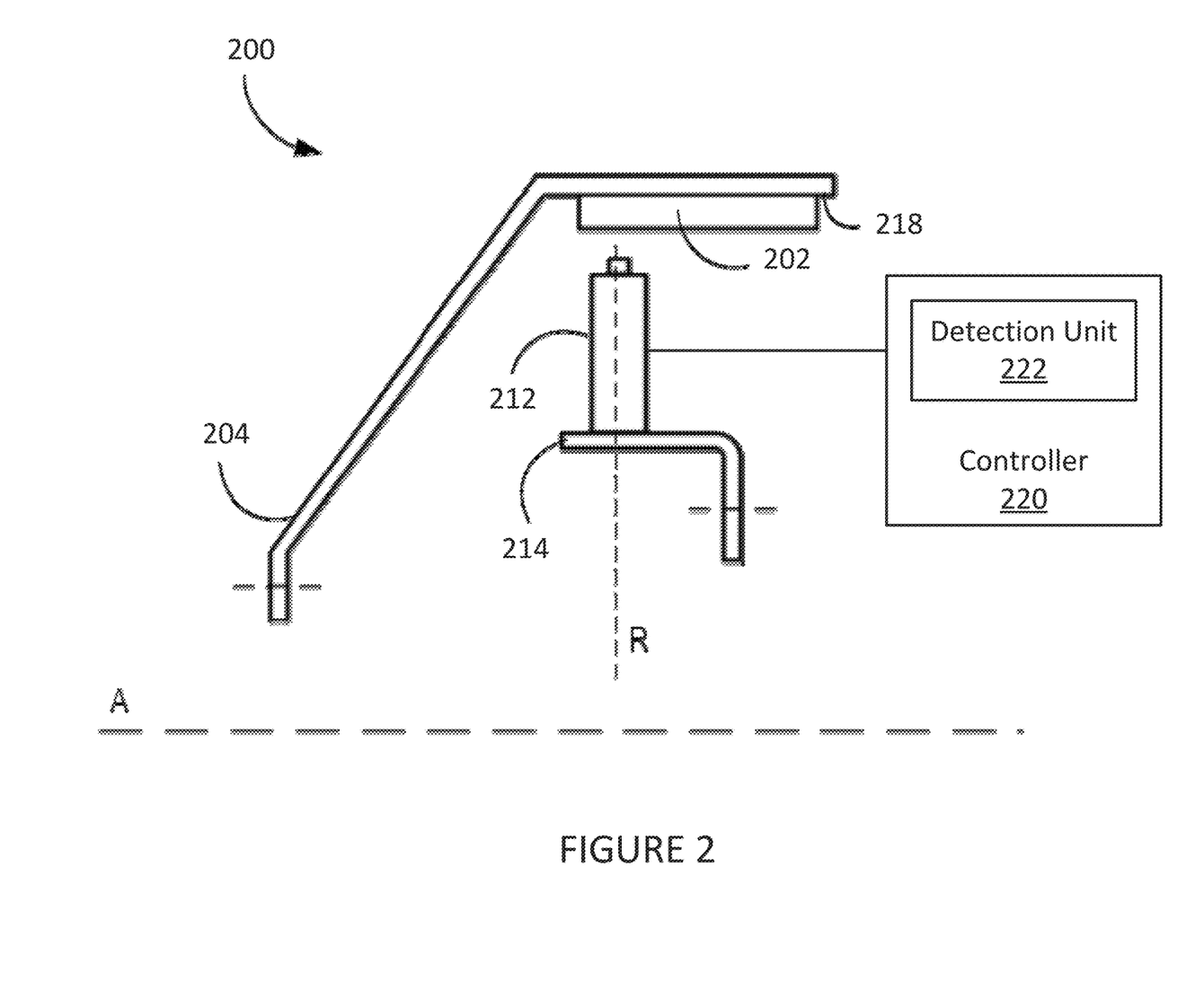
FIG. 2 is a schematic diagram of an example propeller feedback sensing system.

With reference to FIG. 2, a system 200 for sensing a feedback ring (also referred to as a phonic wheel) 204 of an aircraft propeller will now be described. In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback ring 204 in gas-turbine engines, similar techniques can be applied to other types of engines, including electric engines.

The system 200 comprises an annular member 204 and one or more sensors 212 positioned proximate the annular member 204. Annular member 204 (referred to herein as a feedback ring) has a plurality of position markers (also referred to as teeth) 202 provided thereon for detection by sensor 212. In some embodiments, the feedback ring 204 is mounted for rotation with propeller 130 and to move axially with adjustment of the blade angle of the blades of the propeller 130, and the sensor 212 is fixedly mounted to a static portion of the engine 110. In other embodiments, the sensor 212 is mounted for rotation with propeller 130 and to move axially with adjustment of the blade angle of the blades of the propeller 130, and the feedback ring 204 is fixedly mounted to a static portion of the engine 110.

The system 200 also includes a controller 220 communicatively coupled to the sensor 212. The sensor 212 is configured for producing a sensor signal which is transmitted to or otherwise received by the controller 220, for example via a detection unit 222 thereof. The sensor signal can be an electrical signal, digital or analog, an optical signal, or any other suitable type of signal. In some embodiments, the sensor 212 produces a series of signal pulses in response to detecting the presence of a position marker 202 in a sensing zone of the sensor 212. For example, the sensor 212 operates on detecting changes in magnetic flux, and has a sensing zone which encompasses a circular or rectangular area or volume in front of the sensor 212. When a position marker 202 is present in the zone, or passes through the zone during rotation of the feedback ring 204, the magnetic flux in the sensing zone is varied by the presence of the position marker 202, and the sensor 212 can produce a signal pulse, which forms part of the sensor signal.

It should be understood that, although the preceding paragraphs focus on the use of the sensor 212 which detects changes in magnetic flux due to the presence of one of the position markers 202 in the sensing zone of the sensor, other types of sensors are also considered.

In the example illustrated in FIG. 2, a side view of a portion of feedback ring 204 and sensor 212 is shown. The sensor 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback ring 204 and the position markers 202. In some other embodiments, in order to provide redundancy, one or more additional sensors, which may be similar to the sensor 212, are provided. For example, an additional sensor 212 may be mounted in a diametrically opposite relationship, or at any angle, relative to the position markers 202, which extend away from the feedback ring 204 and towards the sensor(s) 212. In yet another embodiment, several position markers 202 may be spaced equiangularly about the perimeter of the feedback ring 104. Other embodiments may apply.

Figure 3:
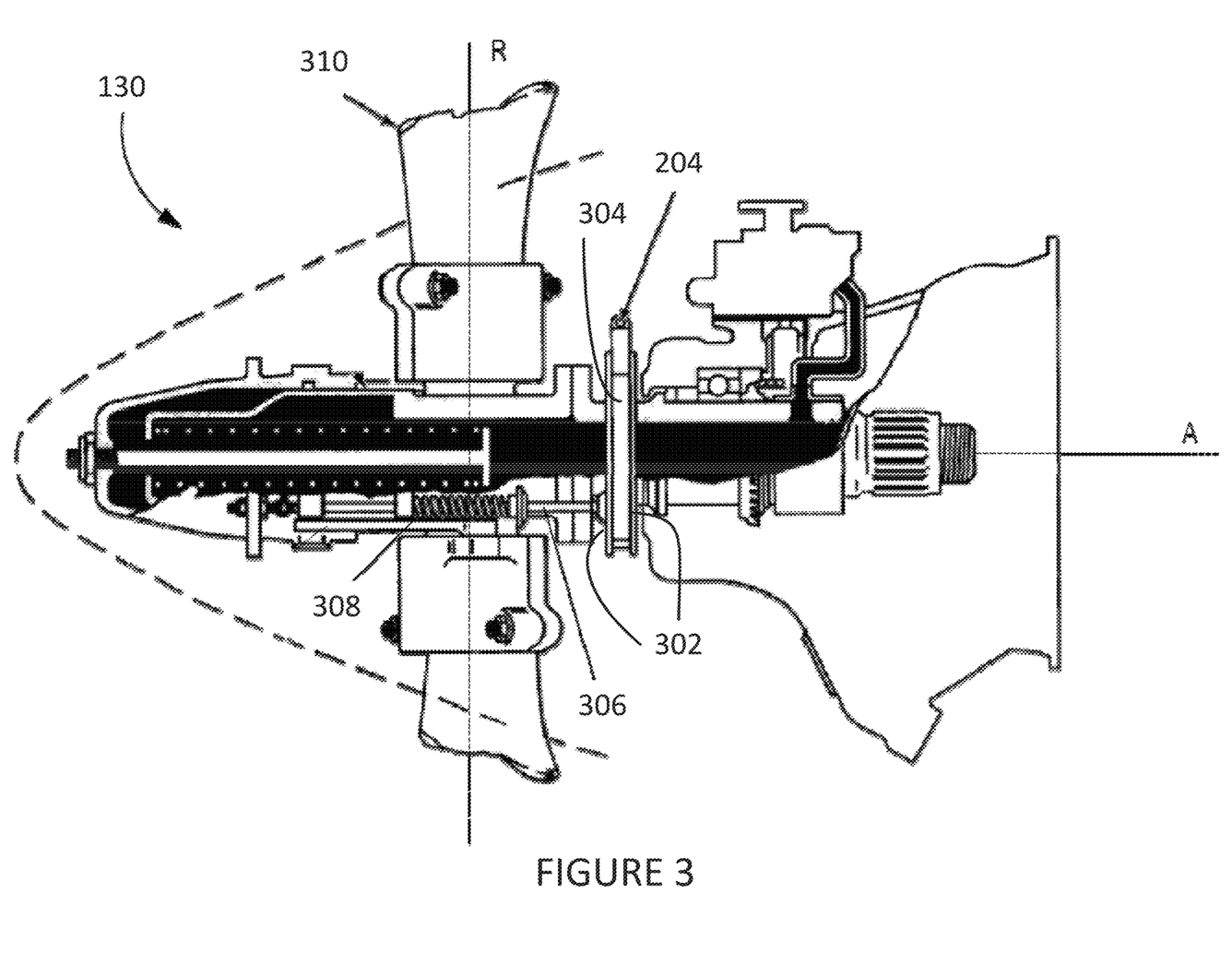
FIG. 3 is a schematic diagram of the propeller of FIG. 1 with the feedback ring of FIG. 2, in accordance with an embodiment.

With additional reference to FIG. 3, in some embodiments the feedback ring 204 is embodied as a circular disk which rotates as part of the engine 110, for example with the output shaft 124 or with the propeller 130. The feedback ring 204 comprises opposing faces 302 and defines a root surface 304 which extends between the opposing faces 302 and is circumscribed by them. Put differently, the root surface 304 of the feedback ring 204 is the outer periphery of the circular disk which spans between the two opposing faces 302. In these embodiments, the position markers 202 can take the form of projections which extend from the root surface 304.

The position markers 202 may comprise a plurality of first projections (not shown) arranged along a direction substantially transverse to the opposing faces and substantially equally spaced from one another on the root surface 304. The position markers 202 may also comprise one or more second projections (not shown) each positioned between two adjacent first projections. Each second projection is illustratively oriented along a direction, which is at an angle relative to direction along which the first projections are arranged. The angle can be any suitable value between 1° and 89°, for example 30°, 45°, 60°, or any other value, as appropriate. It should be noted, however, that in some other embodiments the second projection(s) can be co-oriented with the first projections. It should also be noted that in some embodiments, each second projection can be substituted for a groove or inward projection, as appropriate. In addition, in some embodiments, the feedback ring 204 includes only a single second projection while, in other embodiments, the feedback ring 204 can include more than one second projections. In the latter case, the second projections can be oriented along a common orientation or along one or more different orientations and each second projection can be located at substantially a midpoint between two adjacent first projections or can be located close to a particular one of two adjacent first projections.

It should be noted, however, that other embodiments are also considered. In some embodiments, the position markers can be applied to the root surface 304, for instance as strips of metal or other material for detection by the sensor 212, which can be a magnetic flux sensor. In some other embodiments, the position markers can be coloured or contrasting bands of material applied to the root surface 304 for detection by the sensor 212, which can be an optical sensor. Still other embodiments are considered.

The signal pulses produced by the sensor 212, which form part of the electrical signal received by the control system 220, can be used to determine various operating parameters of the engine 110 and the propeller 130. The regular spacing of the first projections can, for example, be used to determine a speed of rotation of the feedback ring 204. In addition, the second projection(s) can be detected by the sensor 212 to determine a blade angle of the propeller 130.

With continued reference to FIG. 3, the feedback ring 204 is supported for rotation with the propeller 130, which rotates about the longitudinal axis 'A'. The feedback ring 204 is also supported for longitudinal sliding movement along the axis A, e.g. by support members, such as a series of circumferentially spaced feedback rods 306 that extend along the longitudinal axis 'A'. A compression spring 308 surrounds an end portion of each rod 306.

As depicted in FIG. 3, the propeller 130 comprises a plurality of angularly arranged blades 310, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

Figure 4:
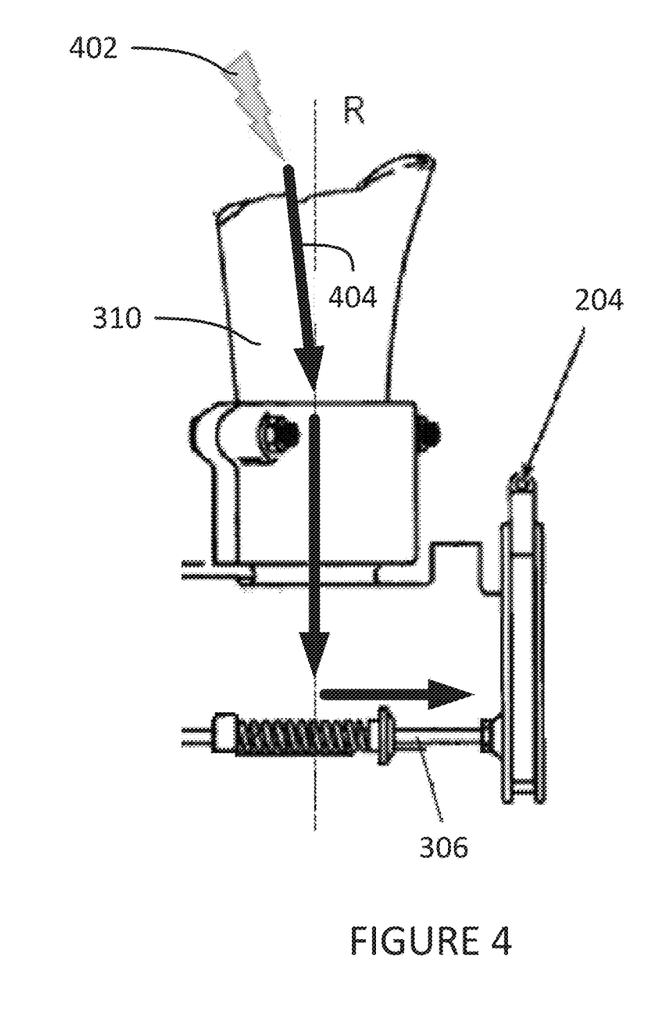
FIG. 4 is a schematic diagram of the electrical conductive path from the propeller of FIG. 1 with the feedback ring of FIG. 2, in accordance with an embodiment.

Referring now to FIG. 4 in addition to FIG. 3, upon a lightning strike 402 to the propeller 130, a current is generated that may propagate from the propeller 130 (e.g. from the blades 310) to the feedback ring 204. In particular, in existing system where the rods 306 are metallic (e.g. made of a stainless steel alloy or any other suitable material), the current may propagate to the feedback ring 204 via the rods 306, along an electrical conductive path illustrated by arrows 404. As a result, the feedback ring 204 may carry a charge that can damage the propeller feedback sensing system or cause a risk to its operation. In addition, lightning may magnetize the feedback ring 204 and generate false triggering of the sensor (reference 212 in FIG. 2). Moreover, because the position markers (reference 202 in FIG. 2) potentially have a low clearance with the sensor 212, lightning current can arc across the air gap between the feedback ring 204 and the sensor 212. This may in turn result in unwanted magnetization of the feedback ring 204 and unacceptably high current levels on the engine harness attached to the sensor 212.

In order to prevent unwanted propeller feedback ring magnetism and arc, it is proposed herein to provide at least one shielding element between the propeller 130 and the feedback ring 204 in order to reduce or remove the electrical conductive path (illustrated by arrows 404 in FIG. 4) for lightning and/or shield the feedback ring 204 from magnetism (e.g. resulting from a lightning strike or occurring in the field or during machining of the feedback ring 204). In other words, the at least one shielding element shields the feedback ring 204 from electromagnetism.

Figure 5A:
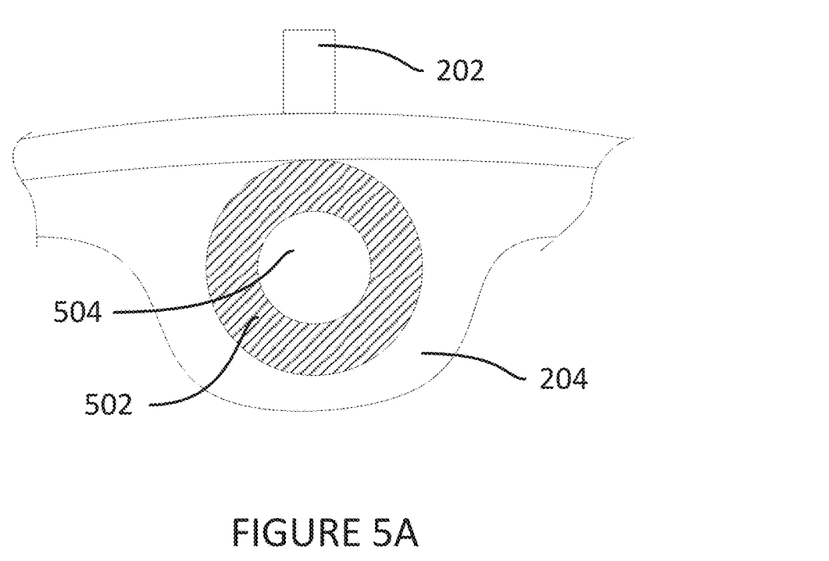
FIGS. 5A and 5B are schematic diagrams of the feedback ring of FIG. 3 with a non-conductive rod assembly, in accordance with an embodiment.
Figure 5B:
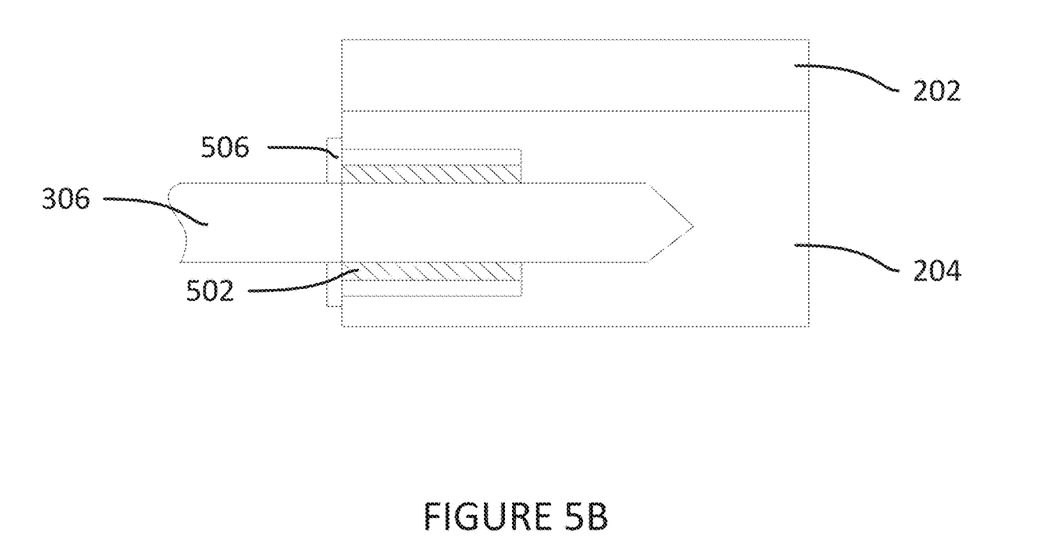

Referring to FIG. 5A and FIG. 5B, in one embodiment, the rod assembly, which supports the feedback ring 204 for longitudinal sliding movement, is made non-conductive. This may be achieved by making the propellers rods 306 from a non-conductive material (instead of a metallic material), such as a polymer or ceramic type material with electrical insulating properties. Alternatively, the inserts (also referred to as bushings or sleeves) 502, which the rods 306 thread into, may be made from a non-conductive material. The inserts 502 may be spaced around a circumference of the feedback ring 204. A threaded aperture 504 may be formed in each insert 502 for receiving therein a given rod 306. A suitable attachment means, such as a jam-nut 506, may be provided to secure each insert 502 to the feedback ring 204. The non-conductive material may comprise any suitable material, including but not limited to, a ceramic material, a non-conductive polymer, and a composite, that allows to electrically isolate the conductive path (reference 404 in FIG. 4) between the propeller 130 and the feedback ring 204.

Referring now to FIG. 6A, FIG. 6B, FIG. 7A, FIG. 7B, and FIG. 8, propeller feedback ring magnetism and arc may in another embodiment be prevented by electrically isolating the position markers 202 from the rods 306, in order to avoid a conductive path for lightning. This is achieved by using a non-conductive material as a barrier in the feedback ring 204. In particular, the non-conductive material serves as an electrical insulator that electrically disconnects the signal inducing position markers 202 from the feedback ring's support base (i.e. the rods 306), and therefore from propeller 130.

Figure 6A:
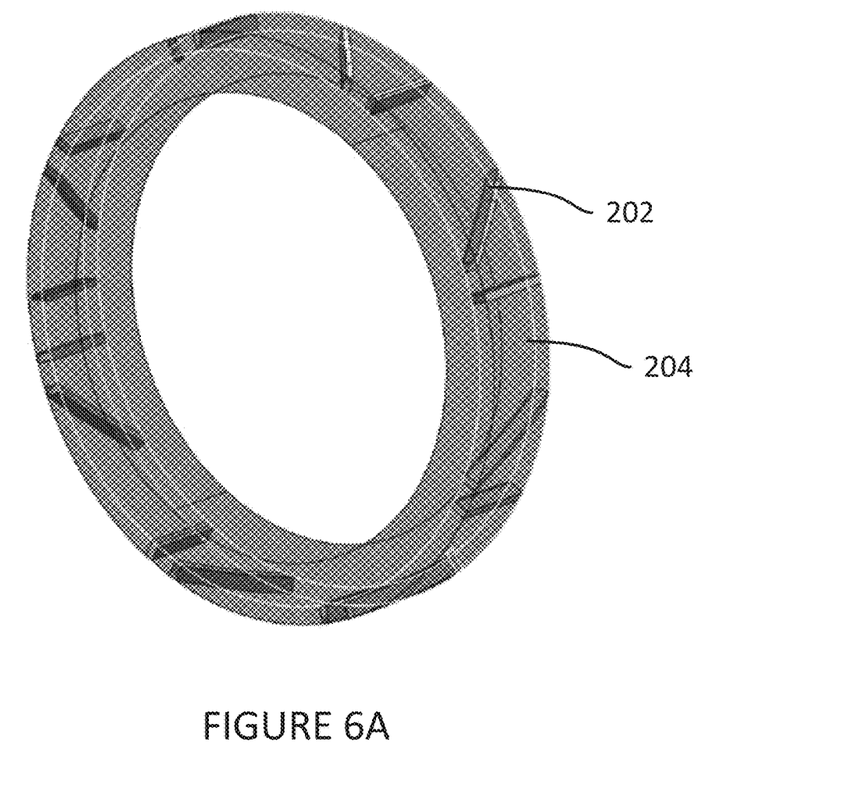
FIG. 6A and FIG. 6B are schematic diagrams of the feedback ring of FIG. 3 with the feedback ring being made of a non-conductive material to electrically isolate the position markers from the feedback rods, in accordance with an embodiment.
Figure 6B:
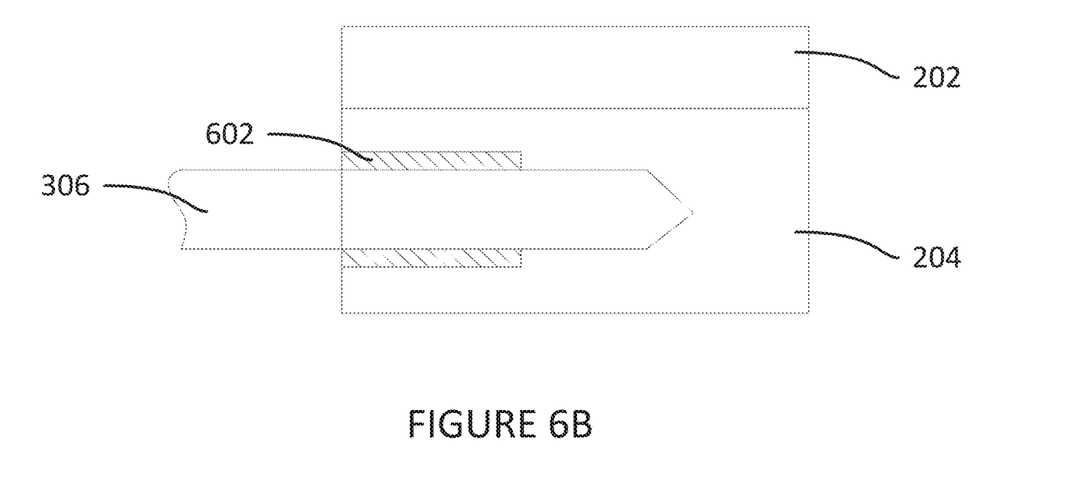

In the embodiment illustrated in FIG. 6A and FIG. 6B, the feedback ring 204 is made of a non-conductive material (e.g. plastic, composite or polymer) that supports the position markers 202 at appropriate locations. The non-conductive material may be a composite material. A plurality of metallic (e.g. ferrous) thread inserts 602 may be received in the feedback ring 204 at appropriate locations, each metal thread insert 602 adapted to receive therein a given one of the rods 306.

Figure 7A:
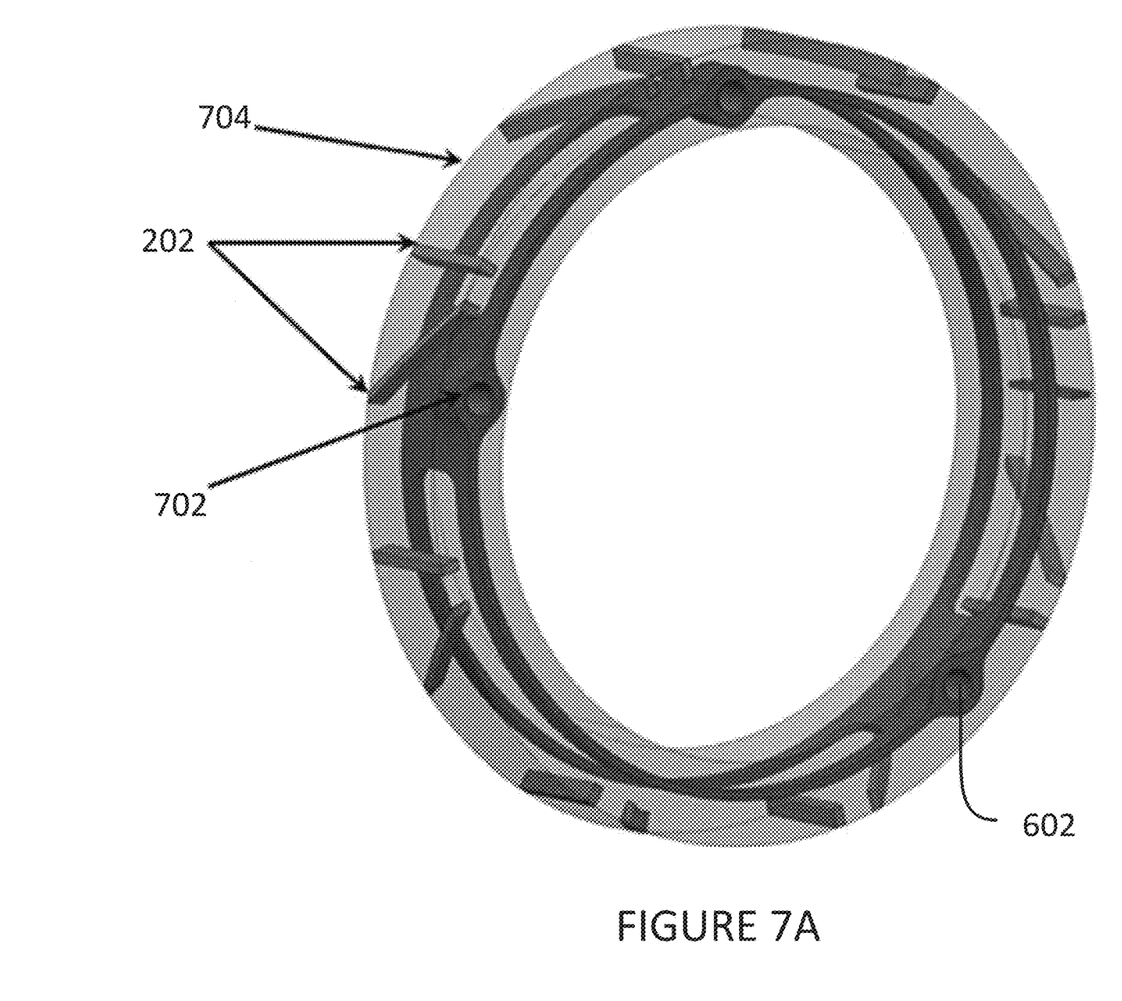
FIG. 7A and FIG. 7B are schematic diagrams of the feedback ring of FIG. 3 with the feedback ring being made of a non-conductive material to electrically isolate the position markers from the feedback rods, in accordance with another embodiment.
Figure 7B:
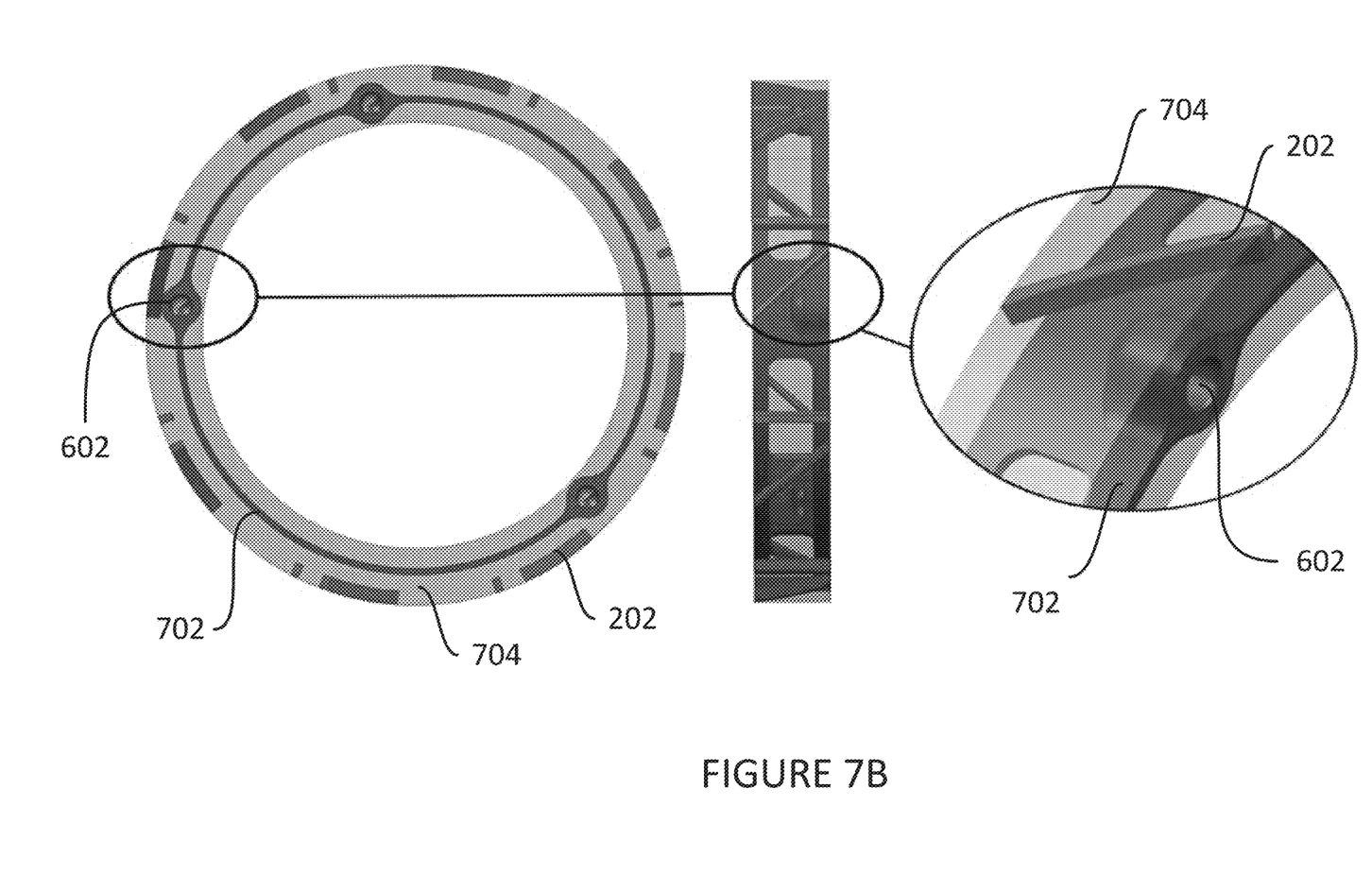

As shown in FIG. 7A and FIG. 7B, in another embodiment, a metallic inner ring 702 may be provided to strengthen the rod inserts 602 that the rods (reference 306 in FIG. 5) are received into. The inner ring 702 is illustratively positioned at a distance away from the position markers 202 in order to break the electrical conducive path between the propeller 130 and the feedback ring 204 and achieve the desired shielding effect. The feedback ring 204 may therefore comprise the inner ring 702, which supports the rod inserts 602, and an outer ring 704, which is made of a non-conductive material and supports the position markers 202 at appropriate locations. The inner ring 702 has a smaller outer diameter than the outer ring 704. In one embodiment, the inner ring 702 is enclosed in the outer ring 704, with the position markers 202 being encapsulated by the outer ring 704. The rod inserts 602 may form an integral part of the inner ring 702 and are illustratively made of the same conductive material (e.g. metal) as the inner ring 702.

Figure 8:
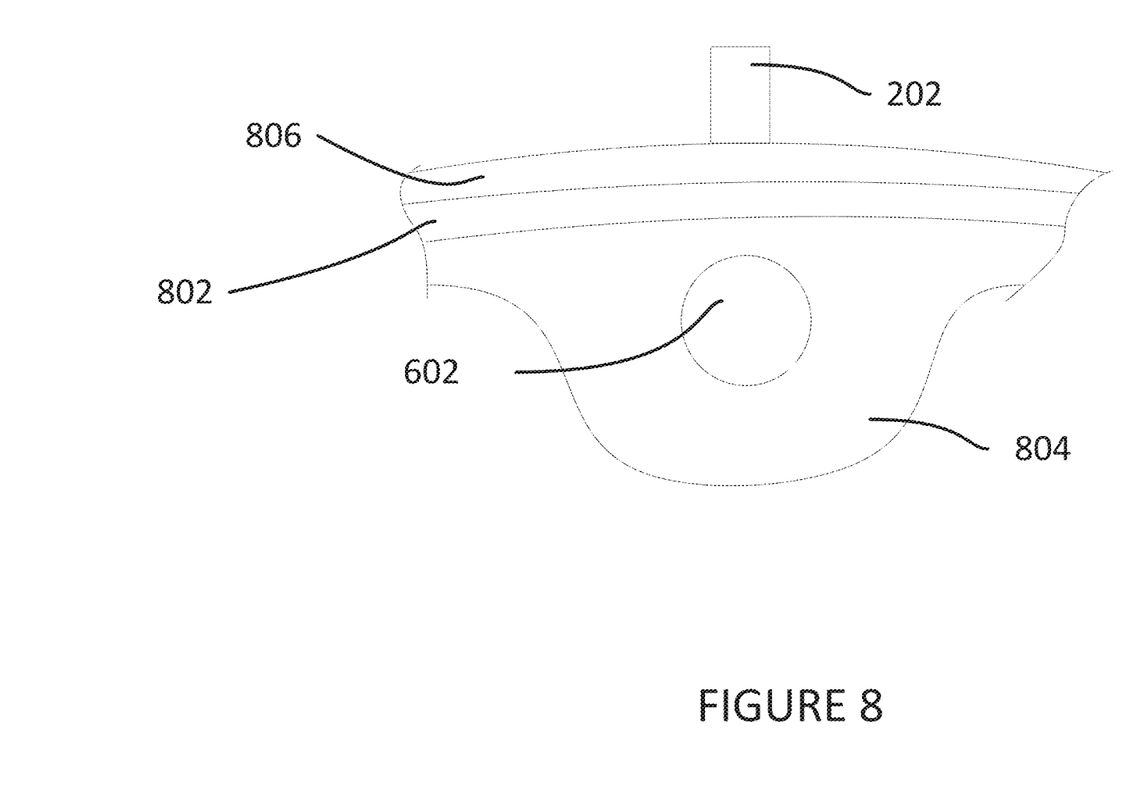
FIG. 8 is a schematic diagram of the feedback ring of FIG. 3 with an insulating layer being positioned between the position markers and the feedback rods, in accordance with another embodiment.

Referring now to FIG. 8, in another embodiment, instead of making the feedback ring 204 from a non-conductive material, a non-conductive insulator 802 is provided as a separating layer between the position markers 202 and the rods (reference 306 in FIG. 5). In particular, the insulator 802 may be provided as a layer that is positioned between a metallic inner ring 804, which receives the threaded inserts 602, and a metallic outer ring 806, which supports the position markers 202. The insulator 802 is made from any suitable non-conductive material, such as plastic, a polymer, a ceramic material, or the like.

Referring back to FIG. 2, in yet another embodiment, propeller feedback ring magnetism and arc may be prevented by providing a layer of insulator coating on the feedback ring 204 (or the sensor 212). The insulator coating may be selected to increase the dielectric resistance of the air gap between the feedback ring 204 and the sensor 212, thus preventing lightning from passing through the feedback ring 204. The insulator coating may be made of any material that has higher isolating properties than air and does not influence magnetic fields. For example, the insulator coating may be made of rubber, ceramic, Teflon, kapton, and the like. Alternatively, a number of solutions may be used to prevent magnetic fields present on the feedback ring 204 from falsely triggering the sensor 212. For example, a targeted magnetic field blocking nano-plating may be used on the entire feedback ring 204, except for the position markers 202. In other words, the nano-plating may be used on the root surface (reference 304 in FIG. 3). In another embodiment, in order to prevent the feedback ring 204 from becoming magnetized, the feedback ring 204 may be made of a material with high resistivity to becoming magnetized, i.e. a high magnetic permeability and low magnetic remanence material such as a high-permeability alloy. In yet another embodiment, a thin layer (e.g. of thickness in the range of 0.020 inches to 0.080 inches) of the high magnetic permeability and low magnetic remanence material may be applied on the root surface 304, between each position marker 202, in order to prevent magnetized spots on the feedback ring 204 from falsely triggering the sensor 212. In one embodiment, Mu metal is used as the high magnetic permeability and low magnetic remanence material. As known to those skilled in the art, magnetic shielding made with materials, such as Mu metal, works by providing a path for the magnetic field lines around the shielded area. It should however be understood that materials other than Mu metal may apply. These high magnetic permeability and low magnetic remanence materials include, but are not limited to, electrical steel, stainless solenoid, and ferrite ceramics.

It should be understood that the magnetism and arc prevention solutions described herein may be used in combination to provide combined benefits. Indeed, a first solution may be used to electrically isolate the feedback ring 204 from the propeller 130 and a second solution may be used to shield the feedback ring 204 from magnetism. For example, the rods 306 may be made from a non-conductive material, as discussed above with reference to FIG. 5A and FIG. 5B, while a layer of Mu metal is applied on the root surface 304 of the feedback ring 204. Other suitable combinations of the solutions described herein may apply.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the feedback ring and related systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly for a propeller of an aircraft engine, the propeller rotatable about a first axis and having propeller blades rotatable about respective second spanwise axes to adjust a blade angle thereof, the blade angle feedback assembly comprising:
   a feedback ring having a plurality of position markers disposed thereon;
   at least one sensor configured to provide feedback on the blade angle of the propeller blades by detecting a relative movement between the feedback ring and the at least one sensor; and
   at least one shielding element provided between the feedback ring and the propeller, the at least one shielding element configured to shield the feedback ring from electromagnetism.

2. The blade angle feedback assembly of claim 1, wherein the feedback ring is coupled to the propeller to rotate with the propeller and to move along the first axis with adjustment of the blade angle, and the plurality of position markers is spaced around a circumference of the feedback ring, and further wherein the at least one sensor is configured to detect, as the feedback ring rotates about the first axis, passage of the plurality of position markers to provide feedback on the blade angle.

3. The blade angle feedback assembly of claim 1, further comprising a plurality of rods coupled to the feedback ring and extending along a direction parallel to the first axis, the plurality of rods configured to support the feedback ring for longitudinal sliding movement along the first axis with adjustment of the blade angle, and further wherein the at least one shielding element comprises the plurality of rods being made from a non-conductive material.

4. The blade angle feedback assembly of claim 1, further comprising a plurality of rods coupled to the feedback ring and extending along a direction parallel to the first axis, the plurality of rods configured to support the feedback ring for longitudinal sliding movement along the first axis with adjustment of the blade angle, and further wherein the feedback ring comprises a plurality of threaded inserts spaced around a circumference of the feedback ring and each configured to receive therein a given one of the plurality of rods, the at least one shielding element comprising the plurality of threaded inserts being made from a non-conductive material.

5. The blade angle feedback assembly of claim 4, wherein the plurality of threaded inserts are made from a ceramic material.

6. The blade angle feedback assembly of claim 1, wherein the at least one shielding element comprises the feedback ring being made from one of a non-conductive material and a material having resistivity to becoming magnetized.

7. The blade angle feedback assembly of claim 6, wherein the feedback ring is made from a non-conductive polymer.

8. The blade angle feedback assembly of claim 1, further comprising a plurality of rods coupled to the feedback ring and extending along a direction parallel to the first axis, the plurality of rods configured to support the feedback ring for longitudinal sliding movement along the first axis with adjustment of the blade angle, wherein the plurality of position markers is spaced around a circumference of the feedback ring and oriented at an angle relative to one another and relative to the first axis, the feedback ring further comprising a metallic inner ring configured to receive the plurality of rods therein and an outer ring configured to encapsulate the plurality of position markers, the at least one shielding element comprising the outer ring being made from a non-conductive material.

9. The blade angle feedback assembly of claim 8, wherein the outer ring is made from a non-conductive polymer.

10. The blade angle feedback assembly of claim 1, further comprising a plurality of rods coupled to the feedback ring and extending along a direction parallel to the first axis, the plurality of rods configured to support the feedback ring for longitudinal sliding movement along the first axis with adjustment of the blade angle, wherein the plurality of position markers is spaced around a circumference of the feedback ring and oriented at an angle relative to one another and relative to the first axis, the feedback ring further comprising a metallic inner ring configured to receive the plurality of rods therein and a metallic outer ring configured to support the plurality of position markers thereon, the at least one shielding element comprising a separating layer disposed between the inner ring and the outer ring, the separating layer made from a non-conductive material.

11. The blade angle feedback assembly of claim 1, wherein the at least one shielding element comprises an insulator coating applied on one of the feedback ring and the at least one sensor for increasing a dielectric resistance of an air gap between the feedback ring and the at least one sensor.

12. The blade angle feedback assembly of claim 1, wherein the feedback ring has first and second opposing faces and defines a root surface that extends and is circumscribed by the first and second faces, the plurality of position markers spaced around a circumference of the feedback ring, oriented at an angle relative to one another and relative to the first axis, and extending away from the root surface, the at least one shielding element comprising one of a plating and a coating applied on the root surface, the plating being a magnetic field blocking nano-plating and the coating being made of a material having resistivity to becoming magnetized.

13. An aircraft propeller system comprising:
a propeller rotatable about a first axis and having propeller blades rotatable about respective second spanwise axes to adjust a blade angle thereof;
a feedback ring having a plurality of position markers disposed thereon, the plurality of position markers spaced around a circumference of the feedback ring; and
at least one shielding element provided between the feedback ring and the propeller, the at least one shielding element configured to shield the feedback ring from electromagnetism.

14. The aircraft propeller system of claim 13, further comprising a plurality of rods coupled to the feedback ring and extending along a direction parallel to the first axis, the plurality of rods configured to support the feedback ring for longitudinal sliding movement along the first axis with adjustment of the blade angle, wherein the at least one shielding element comprises the plurality of rods being made from a non-conductive material.

15. The aircraft propeller system of claim 13, further comprising a plurality of rods coupled to the feedback ring and extending along a direction parallel to the first axis, the plurality of rods configured to support the feedback ring for longitudinal sliding movement along the first axis with adjustment of the blade angle, wherein the feedback ring comprises a plurality of threaded inserts spaced around the circumference of the feedback ring and each configured to receive therein a given one of the plurality of rods, the at least one shielding element comprising the plurality of threaded inserts being made from a non-conductive material.

16. The aircraft propeller system of claim 13, wherein the at least one shielding element comprises the feedback ring being made from one of a non-conductive material and a material having resistivity to becoming magnetized.

17. The aircraft propeller system of claim 13, further comprising a plurality of rods coupled to the feedback ring and extending along a direction parallel to the first axis, the plurality of rods configured to support the feedback ring for longitudinal sliding movement along the first axis with adjustment of the blade angle, wherein the plurality of position markers is oriented at an angle relative to one another and relative to the first axis, the feedback ring further comprising a metallic inner ring configured to receive the plurality of rods therein and an outer ring configured to encapsulate the plurality of position markers, the at least one shielding element comprising the outer ring being made from a non-conductive material.

18. The aircraft propeller system of claim 13, further comprising a plurality of rods coupled to the feedback ring and extending along a direction parallel to the first axis, the plurality of rods configured to support the feedback ring for longitudinal sliding movement along the first axis with adjustment of the blade angle, wherein the plurality of position markers is oriented at an angle relative to one another and relative to the first axis, the feedback ring further comprising a metallic inner ring configured to receive the plurality of rods therein and a metallic outer ring configured to support the plurality of position markers thereon, the at least one shielding element comprising a separating layer disposed between the inner ring and the outer ring, the separating layer made from a non-conductive material.

19. The aircraft propeller system of claim 13, wherein the at least one shielding element comprises an insulator coating applied on one of the feedback ring and the at least one sensor for increasing a dielectric resistance of an air gap between the feedback ring and the at least one sensor.

20. The aircraft propeller system of claim 13, wherein the feedback ring has first and second opposing faces and defines a root surface that extends and is circumscribed by the first and second faces, the plurality of position markers oriented at an angle relative to one another and relative to the first axis, and extending away from the root surface, the at least one shielding element comprising one of a plating and a coating applied on the root surface, the plating being a magnetic field blocking nano-plating and the coating being made of a material having resistivity to becoming magnetized.

\* \* \* \* \*